United States Patent [19]

Yamamoto

[11] Patent Number: 4,955,639
[45] Date of Patent: Sep. 11, 1990

[54] STRUCTURE FOR MOUNTING A SLIP JOINT

[75] Inventor: Toshimasa Yamamoto, Aichi, Japan

[73] Assignee: Kabushiki Kaisha Tokai-Rika-Denki-Seisakusho, Aichi, Japan

[21] Appl. No.: 276,132

[22] Filed: Nov. 25, 1988

[30] Foreign Application Priority Data

Nov. 27, 1987 [JP] Japan .................... 62-180637[U]

[51] Int. Cl.$^5$ ............................................. B60R 22/18
[52] U.S. Cl. ................................................. 280/808
[58] Field of Search .............. 280/808, 801, 804, 806; 297/483, 486; 24/198

[56] References Cited

U.S. PATENT DOCUMENTS

| 4,130,253 | 12/1978 | Yasumatsu | 280/808 |
| 4,549,749 | 10/1985 | Thomas | 280/808 |
| 4,564,219 | 1/1986 | Baden et al. | 280/808 |

FOREIGN PATENT DOCUMENTS 3600540 7/1986 Fed. Rep. of Germany ...... 280/808

Primary Examiner—David M. Mitchell
Attorney, Agent, or Firm—Oliff & Berridge

[57] ABSTRACT

A structure for supporting a slip joint in which the slip joint serves to support a vehicle webbing in such a manner that the webbing is movable in the lengthwise direction of the vehicle and is pivotally supported by a support member attached to a vehicle body, so that an extension of a line running in a direction of a resultant force of a webbing takeup force and a webbing pulling-out force passes through the portion where the slip joint is pivotally supported by the support member. The moment which is produced by the resultant force and which acts on the slip joint is therefore eliminated or reduced.

7 Claims, 5 Drawing Sheets

STRUCTURE FOR MOUNTING A SLIP JOINT

BACKGROUND OF THE INVENTION

1. Field of the Invention

The present invention relates to a structure for mounting a slip joint on the body of a vehicle for use in a seat belt system with which the vehicle is equipped.

2. Description of Related Art

As shown in FIG. 8, a conventional slip joint 80 has a form in which a lower portion 84 is bent relative to an upper portion 82, a bolt insertion hole 86 being provided in the upper portion 82 and an elongated hole 90 through which a webbing 88 is passed such that the webbing 88 is slidably supported thereby being provided in the lower portion 84. The slip joint 80 is slidably mounted on the side wall 94 of a vehicle with the aid of a bolt 92. In such a conventional structure for mounting a slip joint, however, when the webbing 88 provided as shown in FIG. 8 is pulled out against the take-up force exerted by a take-up apparatus (not shown), clockwise moment A acts on a portion adjacent to the upper end of the upper portion 82 of the slip joint 80 to produce a pinching force F which acts on the slip joint 80 such as to press it against the side wall of the vehicle. The magnitude of the pinching force F is proportional to the moment A produced by resultant force F3 of a take-up force F1 and a pulling-out force F2 of the webbing 88. The moment A is determined by the product of the resultant force F3 and the moment arm A1 which intersects at right angles an extension of the line representing the resultant force F3 and which passes through a point adjacent to the upper end of the slip joint 80.

If a seat occupant around which the webbing is fastened moves in the lengthwise direction of the vehicle, the slip joint 80 cannot be easily rotated around the bolt 92 and so does not follow the movement of the portion of the webbing placed around the seat occupant, resulting in an unpleasant feeling when the webbing is pulled out.

SUMMARY OF THE INVENTION

In consideration of the above-described problem, it is an object of the present invention to provide a structure for mounting a slip joint which enables the slip joint to slide smoothly in accordance with the movement of a webbing and which provides for an improved performance in terms of the feeling experienced by the occupant around which the webbing is placed when the latter is pulled out.

In accordance with the present invention, a structure for pivotally mounting a slip joint has a portion for suspending a movable webbing to restrain an occupant, and a pivotal support portion which is pivoted on a support member of a vehicle body. The slip joint is supported on the support member of the vehicle body so that an extension of a line of the resultant force of a webbing takeup force and a webbing pulling-out force acting on the suspending portion substantially passes through the pivotal support portion as well as crossing the axis of the support member at right angles.

The above-described structure causes the moment produced by the resultant force of the webbing takeup force and the webbing pulling-out force to be reduced or eliminated because the moment arm itself is reduced or eliminated. The pinching force which acts on the slip joint to press it against the vehicle body is therefore reduced or eliminated so that the slip joint can slide smoothly while following the movement of the webbing.

DETAILED DESCRIPTION OF PREFERRED EMBODIMENTS

Figure 1:
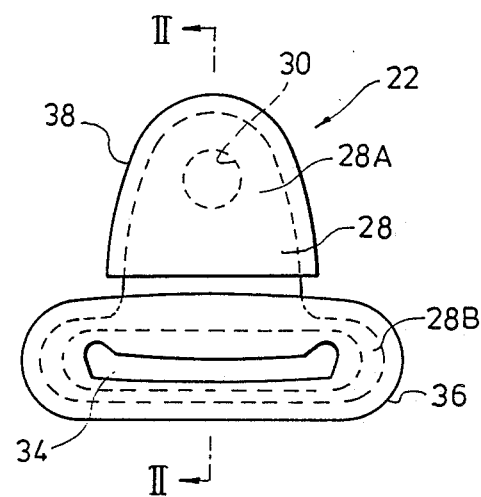
FIG. 1 is a front view of a slip joint in an embodiment of the present invention.
Figure 2:
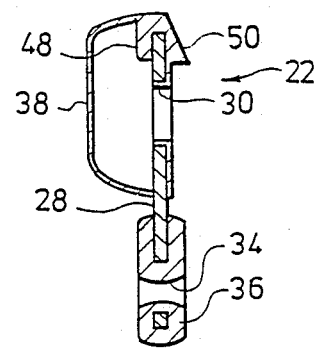
FIG. 2 is a sectional view taken along the line II—II of FIG. 1 as viewed in the direction shown by the arrow.

One end of a webbing 14 is engaged with a lower portion of the side wall 18 of a vehicle by means of an anchor plate 16, while an intermediate portion thereof is looped through a slip joint 22 which is pivotally supported on an upper portion of the side wall 18, and the other end thereof is taken up by a takeup apparatus 24. A tongue plate 20 is slidably provided at an intermediate position of the webbing 14 between the anchor plate 16 and the slip joint 22.

A buckle apparatus 26 is so provided as to stand substantially at the center of the vehicle in the widthwise direction and to engage with the tongue plate 20.

When an occupant 12 causes the tongue plate 20 to engage with the buckle apparatus 26 after sitting on a seat 10 the portion of the webbing between the tongue plate 20 and the slip joint 22 functions as a shoulder webbing, and the portion thereof between the tongue plate 20 and the anchor plate 16 functions as a lap webbing. In this state, the webbing which is the three-point type seat belt system is placed on the occupant.

The slip joint 22 is described in detail below with reference to FIGS. 1 to 4.

The slip joint 22 is provided with a T-shaped body 28 which is formed by being punched out from a steel plate. In this body, a mounting bolt insertion hole 30 is provided through an upper portion 28A which is pivotally supported on the vehicle body so that a mounting bolt 32 comprising a shoulder bolt can be inserted into the hole. An elongated hole 34 is formed in a lower portion 28B of the body 28 through which the webbing is passed, as well as being coated with a synthetic resin material 36 so that an intermediate portion of the webbing 14 passed through the elongated hole 34 will be smoothly guided therethrough.

The slip joint 22 is also provided with a synthetic resin cover 38 which covers the head of the mounting bolt 32 provided on the upper portion 28A of the body 28.

Figure 4:
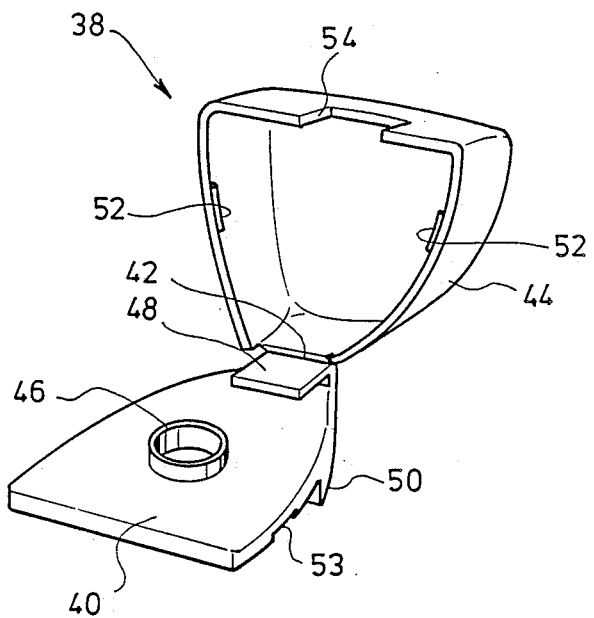
FIG. 4 is a perspective view of a cover.
Figure 7:
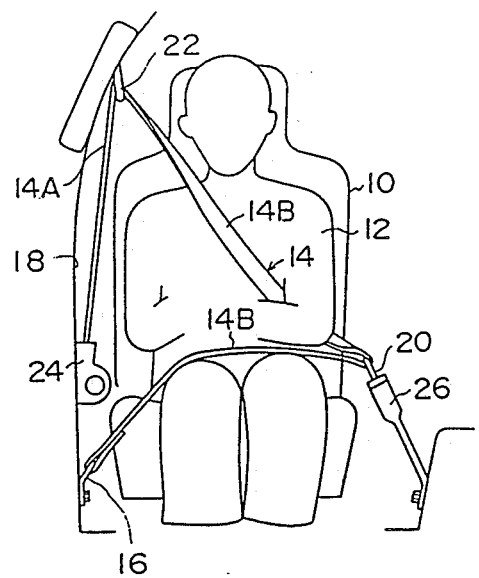
FIG. 7 is a front view of a seat belt apparatus in an embodiment of the present invention.
Figure 8:
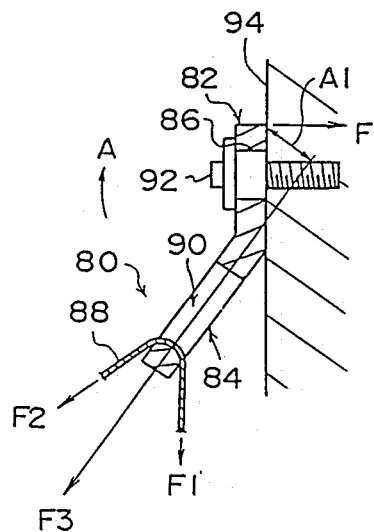
FIG. 8 is an explanatory view of the function of a conventional slip joint.

As shown in FIG. 4, the cover 34 comprises a base 40 which is mounted on the back of the upper portion 28A of the body 28 and a cover portion 44 which serves to cover the surface of the upper portion 28A, the base 40 and the cover portion 44 being connected to each other through a hinge 42 comprising a thin member.

The base 40 comprises a circular projection 46 which is engaged with the mounting bolt insertion hole 30 of the body 28 and which is provided in the surface opposite to the body 28, and a projection 48 which has an approximately L-shaped sectional form and which serves to hold the upper end of the body 28 between the projection 48 and the base 40. In this way, the circular projection 46 is engaged with the mounting bolt insertion hole 30 and the upper end of the body 28 is held between the base 40 and the projection 48 so that any looseness between the body 28 and the base 40 can be prevented. An inclined surface 50 is also provided on an upper portion of the surface of the base 40 opposite to the side wall 18 of the vehicle, to allow it to be brought into contact with the side wall 18 and the body 28 is supported on the side wall 18 at a given inclination angle with respect to the latter. This given inclination angle is so set that the extension of the line running in the direction of the resultant force F3 of the force F1 produced when the webbing is taken up by the take-up apparatus 24 and the force F2 produced when the webbing is pulled out by the occupant passes substantially through the portion of the body 28 which is pivotally supported by the vehicle (in this embodiment, the mounting bolt insertion hole 30 of the body 28) as well as crossing at right angles the axis of the mounting bolt 32. In other words, the given inclination angle is set so that the direction of the resultant force F3 is substantially the same as that of the plate surface of the body 28. As the forces are generally equal, the force F3 acts in the direction of the bisector of the angle between the lines running in the direction of the forces F1 and F2.

The cover portion 44 has engagement projections 52 which are formed on the periphery thereof and which engage with notches 53 formed in the periphery of the base 40 and a rectangular notch 54 through which the upper portion 28A of the body 28 is passed in the state wherein the cover portion 44 and the base 40 are engaged with each other.

On the other hand, a bolt insertion hole 56 into which the mounting bolt 32 is inserted is formed in the side wall 18 of the vehicle, a nut 58 into which the mounting bolt 32 is screwed also being fixed to the back of the side wall 18. As clearly shown in FIG. 3, the nut 58 has a thread axis which is inclined relative to the side wall 18. This inclination is so set that the mounting bolt 32 is inserted substantially at right angles with respect to the direction of the plate surface of the body 28 and can be screwed into the nut 58 when the slip joint 22 (having the body 28 provided at a given angle) is mounted on the side wall 18 of the vehicle as described above.

Description will now be made of the mounting of the slip joint 22 on the side wall 18 of the vehicle in the embodiment configured as described above.

The cover 38 is first mounted on the upper portion 28A of the body 28 by inserting the upper end of the upper portion 28A of the body 28 into the portion between the base 40 and the projection 48 while the projection is being elastically deformed, as well as causing the circular projection 46 to engage with the mounting bolt insertion hole 30. The mounting bolt 32 is then passed through a resin washer 60, the body 28 equipped with the cover 38, a spacer 62 and a spring washer 64, in that order, to be screwed into the nut 58. When the cover portion 44 is then engaged with the base 40 through the engagement projections 52, the mounting of the slip joint 22 on the side wall 18 of the vehicle is completed.

The slip joint 22 mounted in the above-described manner assumes a state wherein the body 28 is inclined at a given angle with respect to the side wall 18 of the vehicle.

In this embodiment, the spring washer 64 has an inclined circular surface 66 along the periphery of the surface which faces the side wall 18 of the vehicle, the upper portion of the inclined surface 66 being placed substantially in the same plane as the inclined surface 50.

Figure 3:
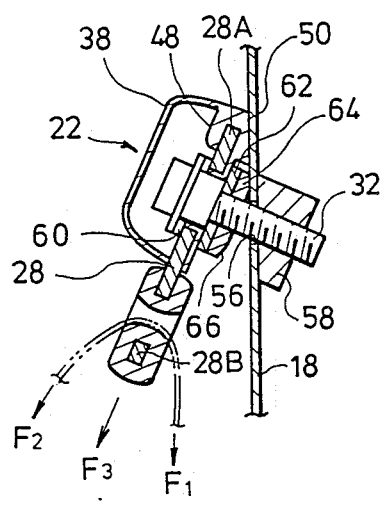
FIG. 3 is an explanatory view of a structure of the present invention.

When the webbing 14 passed through the slip joint 22 which is mounted as described above is pulled out, the resultant force F3 of the webbing takeup force F1 and the webbing pulling-out force F2 is generated. Since, however, the extension of the line running in the direction of the resultant force F3 passes through the mounting bolt insertion hole 30 or the vicinity thereof as well as crossing at right angles the axis of the mounting bolt 32, as shown in FIG. 3, the angular moment produced by the resultant force F3 becomes zero or is reduced because the moment arm of the angular moment is itself eliminated or reduced, whereby the force acting on the slip joint to press it against the side wall 18 also becomes zero or is significantly reduced.

Since the slip joint 22 is therefore not subjected to a pinching force of great magnitude, the slip joint 22 can be smoothly moved around the mounting bolt 32 while following the movement of the webbing, thus providing the seat occupant with a satisfactory feeling when the webbing is pulled out.

Figure 5:
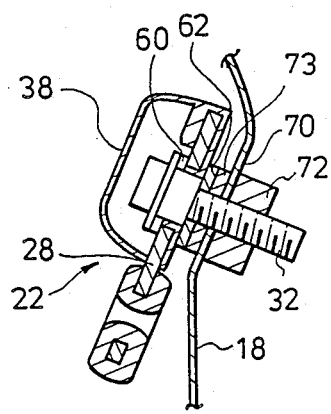
FIGS. 5 and 6 are respectively other embodiments of the present invention.
Figure 6:
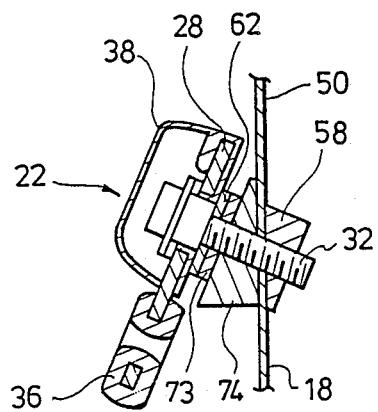

FIGS. 5 and 6 respectively show other embodiments of the present invention.

In the embodiment shown in FIG. 5, although the cover 38 of the slip joint 22 is provided with no inclined surface which can be brought into contact with the side wall 18 of the vehicle, an inclined portion is formed in a portion of the side wall 18 of the vehicle on which the slip joint 22 is mounted so that the slip joint 22 can be mounted on the inclined portion by means of the mounting bolt 32 and a nut 72. This embodiment therefore displays the same function as that achieved by the above-described embodiment. The nut 72 used in this embodiment has an ordinary form.

In the embodiment shown in FIG. 6, a mount 74 which has an inclined surface in contact with the slip joint 22 and which is a separate member is fixed to the side wall 18 so that the slip joint 22 can be mounted on the mount 74 by means of the mounting bolt 32, thus exhibiting the same function as displayed by the above-described embodiment.

In each of the embodiments, the webbing takeup force F1 generally acts in the vertical direction because the takeup apparatus 24 is disposed at a lower position of the side wall 18, and the webbing pulling-out force F2 acts toward the shoulder of the seat occupant and thus acts in an inclined direction from the vertical direction. The direction of the resultant force F3 is therefore inclined from the vertical direction, and thus the axial direction of the resultant force F3 is preferably inclined from the horizontal direction.

The structure for mounting the slip joint to which the present invention relates enables the slip joint to be smoothly moved in accordance with the movement of the webbing and allows the webbing to be pulled out smoothly. The structure therefore has the effect of improving the feeling experienced by the seat occupant when the webbing is pulled out.

What is claimed is:

1. A structure for pivotally mounting a slip joint on a vehicle body, comprising:

a support member attached to said vehicle body; and a slip joint, said slip joint having a suspending portion for suspending a webbing movably along a length of said webbing to restrain an occupant of the vehicle, and a pivotal portion whereby said slip joint is pivotally supported by said support member through said pivotal support portion thereof so that an extension line of a resultant force acting on said suspending portion, of a webbing takeup force from a takeup means acting on said webbing from a first side of the suspending portion and a webbing extension force acting on said webbing from a second side of the suspending portion to extend the webbing from the takeup means, passes through said pivotal support portion and crosses a longitudinal axis of said pivotal support portion substantially at right angles, said slip joint having an inclined surface formed in the vicinity of said pivotal support portion, for contact with the support member.

2. A structure for pivotally mounting a slip joint according to claim 1, wherein said slip joint is slidably supported by said inclined surface so that said extension line passes through said pivotal support portion.

3. A structure for pivotally mounting a slip joint according to claim 1, wherein said support member comprises a mounting bolt.

4. A structure for pivotally mounting a slip joint on a vehicle body, comprising:

a support member attached to said vehicle body; and a slip joint, said slip joint having a suspending portion for suspending a webbing movably along a length of said webbing to restrain an occupant of the vehicle, and a pivotal support portion whereby said slip joint is pivotally supported by said support member so that an extension line of a resultant force acting on said suspending portion, of a webbing takeup force from a takeup means on said webbing from a first side of said suspending portion and a webbing extension force acting on said webbing from a second side of said suspending portion to extend the webbing from the takeup means, substantially corresponds with a straight line passing through said pivotal support portion and said webbing suspending portion and crosses a longitudinal axis of said pivotal support portion substantially at right angles, said slip joint having an inclined surface formed in the vicinity of said pivotal support portion for contact with the support member.

5. A structure for pivotally mounting a slip joint according to claim 4, wherein said support member is a mounting bolt.

6. A structure for pivotally supporting a slip joint on a side wall of a vehicle body by bolt means, comprising:

bolt means secured on the side wall of said vehicle;

a slip joint having a suspending portion for suspending webbing movably along a length of said webbing to restrain an occupant of the vehicle, and a pivotal support portion, whereby said slip joint is pivotally supported on said vehicle body by said bolt means so that an extension line of a resultant force acting on said suspending portion, of a webbing takeup force produced by a takeup means acting on said webbing from a first side of the suspending portion and a webbing from a second side of said suspending portion to extend webbing from the takeup means, passes through said pivotal support portion and intersects an axial line of said bolt means substantially at right angles, said slip joint having an inclined surface formed in the vicinity of said pivotal support portion for contact with said side wall.

7. A structure for pivotally supporting a slip joint according to claim 6, wherein said slip joint is slidably supported by said inclined surface so that said extension line passes through said pivotal support portion.

* * * * *